United States Patent
Hansen et al.

(10) Patent No.: US 11,829,744 B2
(45) Date of Patent: Nov. 28, 2023

(54) SEMI-DECLARATIVE METHOD FOR INFRASTRUCTURE DEPLOYMENT AND ACCESS CONTROL

(71) Applicant: Mastercard International Incorporated, Purchase, NY (US)

(72) Inventors: Thomas Hansen, San Francisco, CA (US); Nicholas Shumeyko, Arlington, VA (US)

(73) Assignee: Mastercard International Incorporated, Purchase, NY (US)

( * ) Notice: Subject to any disclaimer, the term of this patent is extended or adjusted under 35 U.S.C. 154(b) by 0 days.

(21) Appl. No.: 17/563,600

(22) Filed: Dec. 28, 2021

(65) Prior Publication Data

US 2023/0205506 A1    Jun. 29, 2023

(51) Int. Cl.
*G06F 8/65*     (2018.01)
*G06F 21/12*    (2013.01)
*G06F 8/54*     (2018.01)
*G06F 8/71*     (2018.01)

(52) U.S. Cl.
CPC .......... *G06F 8/65* (2013.01); *G06F 8/54* (2013.01); *G06F 8/71* (2013.01); *G06F 21/126* (2013.01)

(58) Field of Classification Search
CPC .......... G06F 8/54; G06F 8/60–66; G06F 8/71; G06F 21/126
USPC .......... 717/120–123, 148, 168–178
See application file for complete search history.

(56) References Cited

U.S. PATENT DOCUMENTS

| | | | |
|---|---|---|---|
| 10,001,986 B1* | 6/2018 | De Gaetano | G06F 8/658 |
| 11,343,142 B1* | 5/2022 | Wang | H04L 41/0813 |
| 2021/0103441 A1* | 4/2021 | Jain | G06F 9/45558 |

FOREIGN PATENT DOCUMENTS

WO    WO-2009111799 A2 *    9/2009    ...... G06F 9/4856

OTHER PUBLICATIONS

Nitu, Configurability in Saas (software as a service) applications, ISEC '09: Proceedings of the 2nd India software engineering conference, Feb. 2009, 8 pages, [retrieved on Jul. 12, 23], Retrieved from the Internet: < URL:http://dl.acm.org/>.*

Software as a service, Wikipedia, 2020, 9 pages, [retrieved on Jul. 12, 2023], Retrieved from the Internet: < URL:https://web.archive.org/web/20201214112330/https://en.wikipedia.org/wiki/Software_as_a_service>.*

* cited by examiner

*Primary Examiner* — Geoffrey R St Leger
(74) *Attorney, Agent, or Firm* — Hovey Williams LLP

(57) ABSTRACT

A computer system includes a processor and a memory device. The computer system is configured to execute a function that builds a software instance definition object. The software instance definition object includes one or more configuration items, attributes, permissions, and linkages to other objects, which define a software instance. The computer system temporarily stores the software instance definition object in the memory device. The computer system updates at least one of the configuration items, attributes, permissions, and linkages to other objects of the stored software instance definition object, thereby creating an updated software instance definition object. A fix command is then executed to update the software instance based on the updated software instance definition object, thereby creating an updated software instance. After creating the updated (Continued)

software instance, the software instance definition object is deleted from the memory device.

17 Claims, 4 Drawing Sheets

SEMI-DECLARATIVE METHOD FOR INFRASTRUCTURE DEPLOYMENT AND ACCESS CONTROL

FIELD OF THE DISCLOSURE

The field of the disclosure relates generally to customer software instances of a software application provided as Software as a Service (SaaS) and, more particularly, to use of semi-declarative techniques for managing customer software instances.

BACKGROUND

Typically, techniques for managing software instances for SaaS applications include one of a scripted paradigm or a declarative paradigm. In traditional scripting models, when building a software instance, a user generates and executes a plurality of scripts. The number of scripts increase with the number of parameters associated with defining a software instance. If the process breaks partway through during generation of the software instance, the user must manually identify and fix problem, then rerun the scripting process. In addition, if a customer requests a change or update that includes a new parameter, the user must either engineer another parameter, or more likely, build an incorrect instance and then manually modify the instance to fit the customer's request.

In traditional declarative models, every time a user builds a new instance, the user needs to copy several definition files and modify them manually. When the user builds the software instances from the manually modified definition files, the process generally completes successfully (assuming the definition files are correct). If the process breaks partway through, the user can just rerun the process. However, any configuration items, attributes, permissions, and/or linkages to other objects that could change the instance but does not also change the declarative file, breaks the declarative file. For example, if a process changes a configuration item (but not the declarative file), the next time the user runs that declaration, the process will revert the change, because the process is only looking at that one file that is used for the process.

SUMMARY

This brief description is provided to introduce a selection of concepts in a simplified form that are further described in the detailed description below. This brief description is not intended to identify key features or essential features of the claimed subject matter, nor is it intended to be used to limit the scope of the claimed subject matter. Other aspects and advantages of the present disclosure will be apparent from the following detailed description of the embodiments and the accompanying figures.

In one aspect, a computer system is provided. The computer system includes a processor and a memory device. The memory device includes computer-executable instructions stored thereon. The computer-executable instructions, when executed by the processor, cause the processor to execute a function that builds a software instance definition object. The software instance definition object includes one or more of a configuration item, attribute, permission, and linkage to other objects. The software instance definition object defines a software instance. The computer system temporarily stores the software instance definition object in the memory device. In addition, the computer system updates one or more of the configuration item, attribute, permission, and linkage to other objects of the stored software instance definition object, thereby creating an updated software instance definition object. The computer system also executes a first command to update the software instance based on the updated software instance definition object, thereby creating an updated software instance. Moreover, the computer system deletes the software instance definition object after creating the updated software instance.

In another aspect, a method executed by an application server is provided. The method includes executing a function that builds a software instance definition object. The software instance definition object includes one or more of the following: a configuration item, attribute, permission, and linkage to other objects. The software instance definition object defines a software instance. The method also includes temporarily storing the software instance definition object in a memory device. Furthermore, the method includes updating one or more of the configuration item, attribute, permission, and linkage to other objects of the stored software instance definition object, thereby creating an updated software instance definition object. In addition, the method includes executing a first command to update the software instance based on the updated software instance definition object, thereby creating an updated software instance. After creating the updated software instance, the method deletes the software instance definition object.

In yet another embodiment, a computer-readable storage medium is provided. The computer-readable storage medium includes computer-executable instructions stored thereon. The computer-executable instructions, when executed by a processor, cause the processor to execute a function that builds a software instance definition object. The software instance definition object includes one or more of a configuration item, attribute, permission, and linkage to other objects. The software instance definition object defines a software instance. The computer-executable instructions cause the processor to temporarily store the software instance definition object in a memory device. In addition, the computer-executable instructions cause the processor to update one or more of the configuration item, attribute, permission, and linkage to other objects of the stored software instance definition object, thereby creating an updated software instance definition object. The processor also executes a first command to update the software instance based on the updated software instance definition object, thereby creating an updated software instance. Moreover, the processor deletes the software instance definition object after creating the updated software instance.

A variety of additional aspects will be set forth in the detailed description that follows. These aspects can relate to individual features and to combinations of features. Advantages of these and other aspects will become more apparent to those skilled in the art from the following description of the exemplary embodiments which have been shown and described by way of illustration. As will be realized, the present aspects described herein may be capable of other and different aspects, and their details are capable of modification in various respects. Accordingly, the figures and description are to be regarded as illustrative in nature and not as restrictive.

BRIEF DESCRIPTION OF THE FIGURES

The figures described below depict various aspects of systems and methods disclosed therein. It should be understood that each figure depicts an embodiment of a particular aspect of the disclosed systems and methods, and that each of the figures is intended to accord with a possible embodiment thereof. Further, wherever possible, the following description refers to the reference numerals included in the following figures, in which features depicted in multiple figures are designated with consistent reference numerals.

Unless otherwise indicated, the figures provided herein are meant to illustrate features of embodiments of this disclosure. These features are believed to be applicable in a wide variety of systems comprising one or more embodiments of this disclosure. As such, the figures are not meant to include all conventional features known by those of ordinary skill in the art to be required for the practice of the embodiments disclosed herein.

DETAILED DESCRIPTION

The following detailed description of embodiments of the invention references the accompanying figures. The embodiments are intended to describe aspects of the invention in sufficient detail to enable those with ordinary skill in the art to practice the invention. The embodiments of the invention are illustrated by way of example and not by way of limitation. Other embodiments may be utilized, and changes may be made without departing from the scope of the claims. The following description is, therefore, not limiting. The scope of the present invention is defined only by the appended claims, along with the full scope of equivalents to which such claims are entitled.

As used herein, the term "database" includes either a body of data, a relational database management system (RDBMS), or both. As used herein, a database includes, for example, and without limitation, a collection of data including hierarchical databases, relational databases, flat file databases, object-relational databases, object-oriented databases, and any other structured collection of records or data that is stored in a computer system. Examples of RDBMS's include, for example, and without limitation, Oracle® Database (Oracle is a registered trademark of Oracle Corporation, Redwood Shores, Calif.), MySQL, IBM® DB2 (IBM is a registered trademark of International Business Machines Corporation, Armonk, N.Y.), Microsoft® SQL Server (Microsoft is a registered trademark of Microsoft Corporation, Redmond, Wash.), Sybase® (Sybase is a registered trademark of Sybase, Dublin, Calif.), and PostgreSQL® (PostgreSQL is a registered trademark of PostgreSQL Community Association of Canada, Toronto, Canada). However, any database may be used that enables the systems and methods to operate as described herein.

Exemplary Computing Environment

Figure 1:
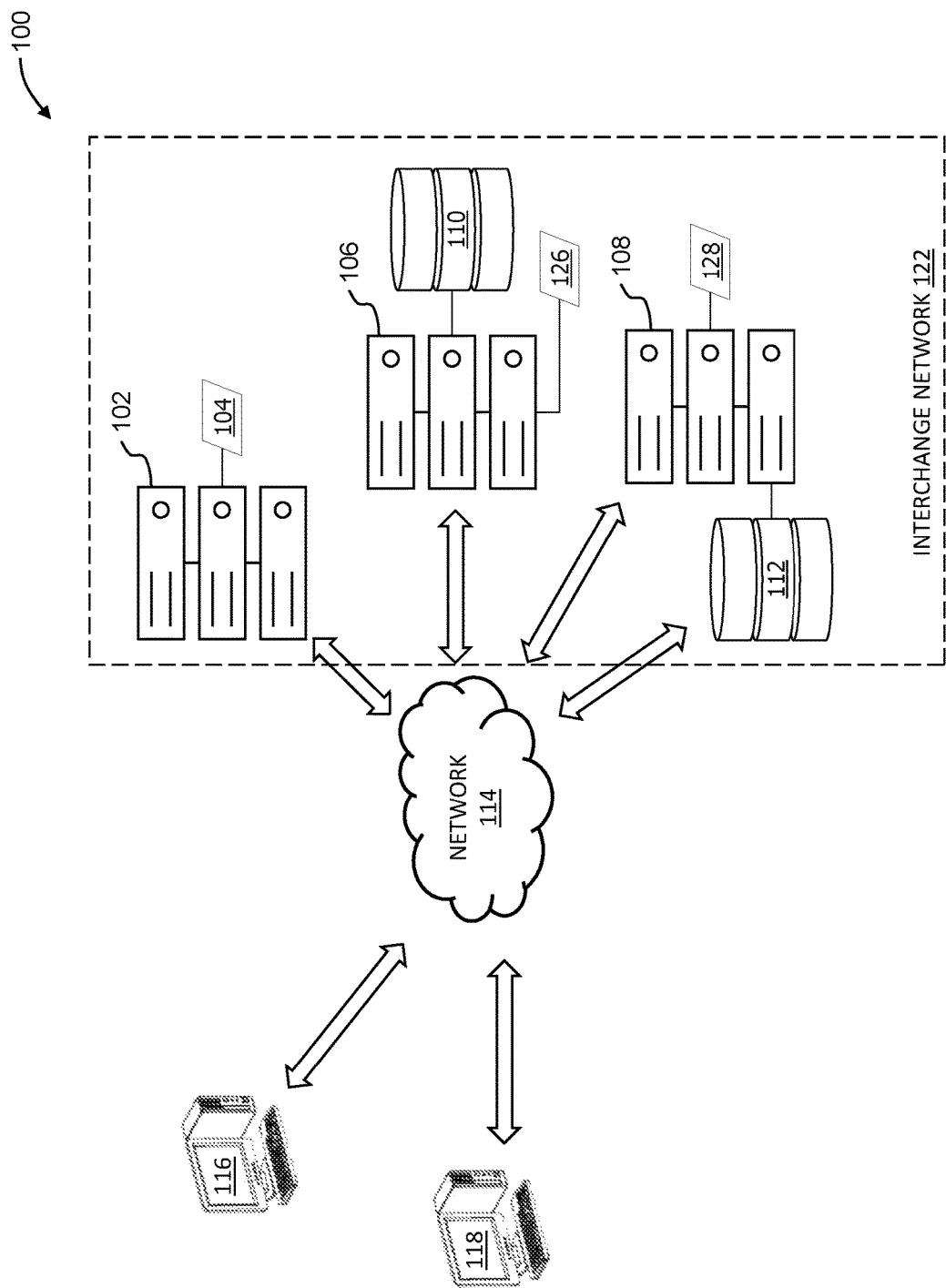
FIG. 1 is an exemplary computing system that provides Software as a Service (SaaS), according to one aspect of the present invention.

FIG. 1 is an exemplary computing system 100 that provides Software as a Service (SaaS), according to one aspect of the present invention. In the exemplary embodiment, the system 100 includes an application server 102; a plurality of database servers 106, 108, each electronically interfaced to a one or more respective databases 110, 112 (broadly, tracking databases or data sources); and a plurality of computing devices 116, 118, interconnected via a communication network 114. As depicted in FIG. 1, the database servers 106, 108 may be coupled to the databases 110, 112, respectively, and/or one or more of the databases 110, 112 may be independently connected to the network 114.

In an example embodiment, the computing devices 116, 118 may be associated with one or more organizations, such as a business, a corporation, a financial services company, or the like. The communication network 114 may include more than one type of network, such as a private network provided between the computing devices 116, 118 and the application server 102, and, separately, the public internet, which facilitates communication between the computing devices 116, 118 and the application server 102. The application server 102 and the database servers 106, 108 may be associated with an interchange network 122 managing the databases 110, 112. Alternatively, the database servers 106, 108 may be associated with a third-party vendor managing the databases 110, 112. It is noted that the location of the computing devices 116, 118, the application server 102, the database servers 106, 108, and the databases 110, 112 can all be located in a single organization or separated, in any desirable and/or selected configuration or grouping, across more than one organization (e.g., third-party vendors). For example, in an example embodiment, the computing devices 116, 118 can be remote computing devices, each associated with a customer of the interchange network 122. Each such remote computing device may be electronically interfaced in communication to the application server 102, which may be located within an organization (e.g., the interchange network 122). In addition, the database servers 106, 108 and associated databases 110, 112 can be located within one or more separate organizations.

In the exemplary embodiment, the computing devices 116, 118 and the application server 102 are electronically interfaced in communication via the communication network 114. The communications network 114 includes, for example and without limitation, one or more of a local area network (LAN), a wide area network (WAN) (e.g., the internet, etc.), a mobile network, a virtual network, and/or any other suitable private and/or public communications network that facilitates communication among the computing devices 116, 118 and the application server 102. In addition, the communication network 114 is wired, wireless, or combinations thereof, and includes various components such as modems, gateways, switches, routers, hubs, access points, repeaters, towers, and the like. In some embodiments, the communications network 114 includes more than one type of network, such as a private network provided between the application server 102 and the database servers 106, 108, and, separately, the public internet, which facilitates communication between the computing devices 116, 118 and the application server 102.

In the depicted example, the application server 102 is configured to provide SaaS. To provide SaaS, the application server 102 hosts a software application 104 (or product). The software application 104 is instance-based, meaning each customer may have a predetermined, unique instance of the software application 104 executing, for example, on its associated computing device, such as one of the computing devices 116, 118. The term "instance" includes a collection of configuration items that are maintained for a specific customer or internal efforts.

In the exemplary embodiment, the application server 102 is operated, for example, by a developer and/or administrator (not shown). The developer builds software instance definitions at the application server 102 for deployment, for example, to one or more of the application server 102 and/or the database servers 106, 108. The software instances are used by customers at the computing devices 116, 118, for example, to query data and/or perform various data analytics based on the data stored in the databases 110, 112. The administrator defines configuration items, attributes, and linkages to other objects at the application server 102 to build an object file in memory that reflects a selected software instance definition. In an example embodiment, the same individual may perform developer and administrator tasks. As used herein, the term "definition" includes a defined set of configuration items, which may or may not actually reflect anything in real life. The term "configuration item" includes system settings, resources, data, databases, records, files, and permissions which are maintained and built via programming code. The terms "real life" or "real-world" include an instance's configuration items as they actually exist, for example, on one or more of the application server 102, database servers 106, 108, and/or databases 110, 112.

In the exemplary embodiment, the application server 102 generates a software instance, based on a selected definition, with a suitable configuration of the software application 104 for each respective customer. In some embodiments, the application server 102 generates unique software instances, such as software instances 126, 128, on various servers, such as the database servers 106, 108. Each software instance 126, 128 may include configuration items, attributes, linkages, etc. that span one or more servers (e.g., database servers 106, 108) as well as other cloud resources, all of which may be shared with one or more other software instances. In the example, customers use the computing devices 116, 118 to access the software instances 126, 128. For example, customers can use the computing devices 116, 118 to access respective software instances 126, 128 through the communications network 114 (e.g., the internet) to utilize the software application 104. The computing devices 116, 118 may be any type of computing device that is connectable to the communications network 114, such as a laptop computer, desktop computer, workstation, personal digital assistant (PDA), smartphone, mobile phone, game console, internet appliance, and the like.

In the exemplary embodiment, each of the databases 110, 112 preferably includes a network disk array (a storage area network (SAN)) capable of hosting large volumes of data. Each of the databases 110, 112 also preferably supports high speed disk striping and distributed queries/updates. It is also preferable that redundant array of inexpensive disks (RAID) and hot pluggable small computer system interface (SCSI) drives are supported. In one example embodiment, the databases 110, 112 are not integrated with the database servers 106, 108 to avoid, for example, potential performance bottlenecks.

Data persisted or stored in the database servers 106, 108 includes, for example, business intelligence (BI) data. The BI data may include a plurality of data objects including, for example, customer transaction data and/or other data, such as account data, merchant data, customer data, search data, social networking data, web data, etc., that can be used to develop intelligence information about individual customers, certain types or groups of customers, transactions, marketing programs, and the like. Each of the data objects comprising the BI data is associated with one or more data parameters. The data parameters facilitate identifying and categorizing the BI data and include, for example, data type, size, date created, date modified, and the like. The BI data informs users, for example, of the computing devices 116, 118, and facilitates enabling the users to improve operational efficiencies, products and/or services, customer marketing, customer retention, risk reduction, and/or the like. For example, in one embodiment, the application server 102 is maintained by a payment network (e.g., the interchange network 122). An authenticated employee of a business organization, such as a financial institution, accesses, for example, a data analytics application implemented on the application server 102 and/or the database servers 106, 108 to query the databases 110, 112. One of ordinary skill will appreciate that embodiments may serve a wide variety of organizations and/or rely on a wide variety of data within the scope of the present invention.

Exemplary Computer Systems

Figure 2:
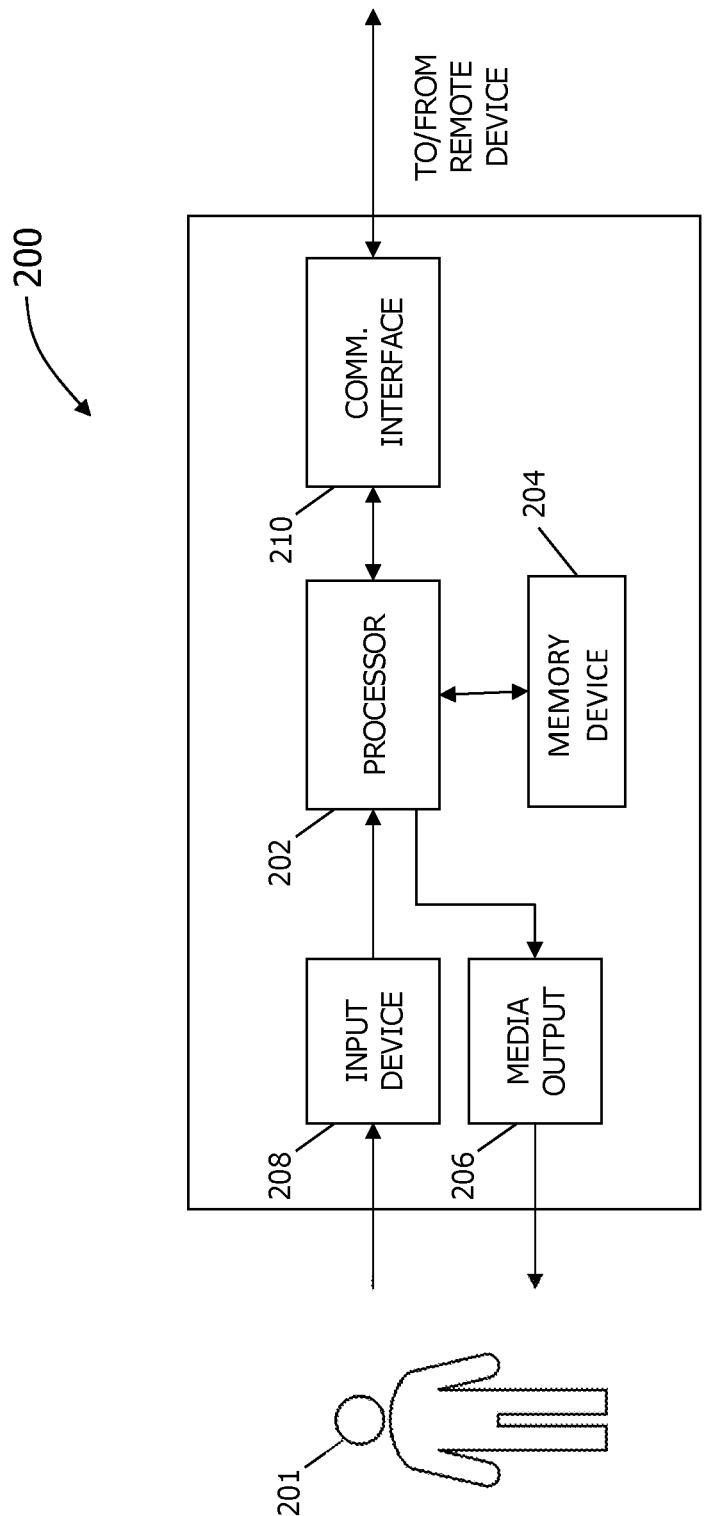
FIG. 2 is an example configuration of a computing system operated by a user of the computing system shown in FIG. 1.

FIG. 2 is an example configuration of a computing system 200 operated by a user 201. In some embodiments, the computing system 200 is a computing device 116 and/or 118 (shown in FIG. 1). In the example embodiment, the computing system 200 includes a processor 202 for executing instructions. In some embodiments, computer-executable instructions are stored in a memory device 204. The processor 202 includes one or more processing units, such as, a multi-core processor configuration. The memory device 204 is any device allowing information such as executable instructions and/or written works to be stored and retrieved. The memory device 204 includes one or more computer readable media.

In one example embodiment, the processor 202 is implemented as one or more cryptographic processors. A cryptographic processor may include, for example, dedicated circuitry and hardware such as one or more cryptographic arithmetic logic units (not shown) that are optimized to perform computationally intensive cryptographic functions. A cryptographic processor may be a dedicated microprocessor for carrying out cryptographic operations, embedded in a packaging with multiple physical security measures, which facilitate providing a degree of tamper resistance. A cryptographic processor facilitates providing a tamper-proof boot and/or operating environment, and persistent and volatile storage encryption to facilitate secure, encrypted transactions.

Because the computing system 200 may be widely deployed, it may be impractical to manually update software for each computing system 200. Therefore, the system 100 may, in some embodiments, provide a mechanism for automatically updating the software on the computing system 200. For example, an updating mechanism may be used to automatically update any number of components and their drivers, both network and non-network components, including system level (OS) software components. In some embodiments, the computing system components are dynamically loadable and unloadable; thus, they may be replaced in operation without having to reboot the OS.

The computing system 200 also includes at least one media output component 206 for presenting information to the user 201. The media output component 206 is any component capable of conveying information to the user 201. In some embodiments, the media output component 206 includes an output adapter such as a video adapter and/or an audio adapter. An output adapter is operatively coupled to the processor 202 and operatively connectable to an output device such as a display device, for example, and without limitation, a liquid crystal display (LCD), organic light emitting diode (OLED) display, or "electronic ink" display, or an audio output device such as a speaker or headphones.

In some embodiments, the computing system 200 includes an input device 208 for receiving input from the user 201. The input device 208 may include, for example, one or more of a touch sensitive panel, a touch pad, a touch screen, a stylus, a position detector, a keyboard, a pointing device, a mouse, and an audio input device. A single component such as a touch screen may function as both an output device of the media output component 206 and the input device 208.

The computing system 200 may also include a communication interface 210, which is communicatively connectable to a remote device such as the application server 102 (shown in FIG. 1) via wires, such as electrical cables or fiber optic cables, or wirelessly, such as radio frequency (RF) communication. The communication interface 210 may include, for example, a wired or wireless network adapter or a wireless data transceiver for use with Bluetooth communication, RF communication, near field communication (NFC), and/or with a mobile phone network, Global System for Mobile communications (GSM), 3G, or other mobile data network, and/or Worldwide Interoperability for Microwave Access (WiMax) and the like.

Stored in the memory device 204 are, for example, computer-executable instructions for providing a user interface to the user 201 via the media output component 206 and, optionally, receiving and processing input from the input device 208. A user interface may include, among other possibilities, a web browser and a client application. Web browsers enable users, such as the user 201, to display and interact with media and other information typically embedded on a web page or a website. A client application allows the user 201 to interact with an instance of the software application 104, such as software instances 126, 128, associated, for example, with the application server 102.

Figure 3:
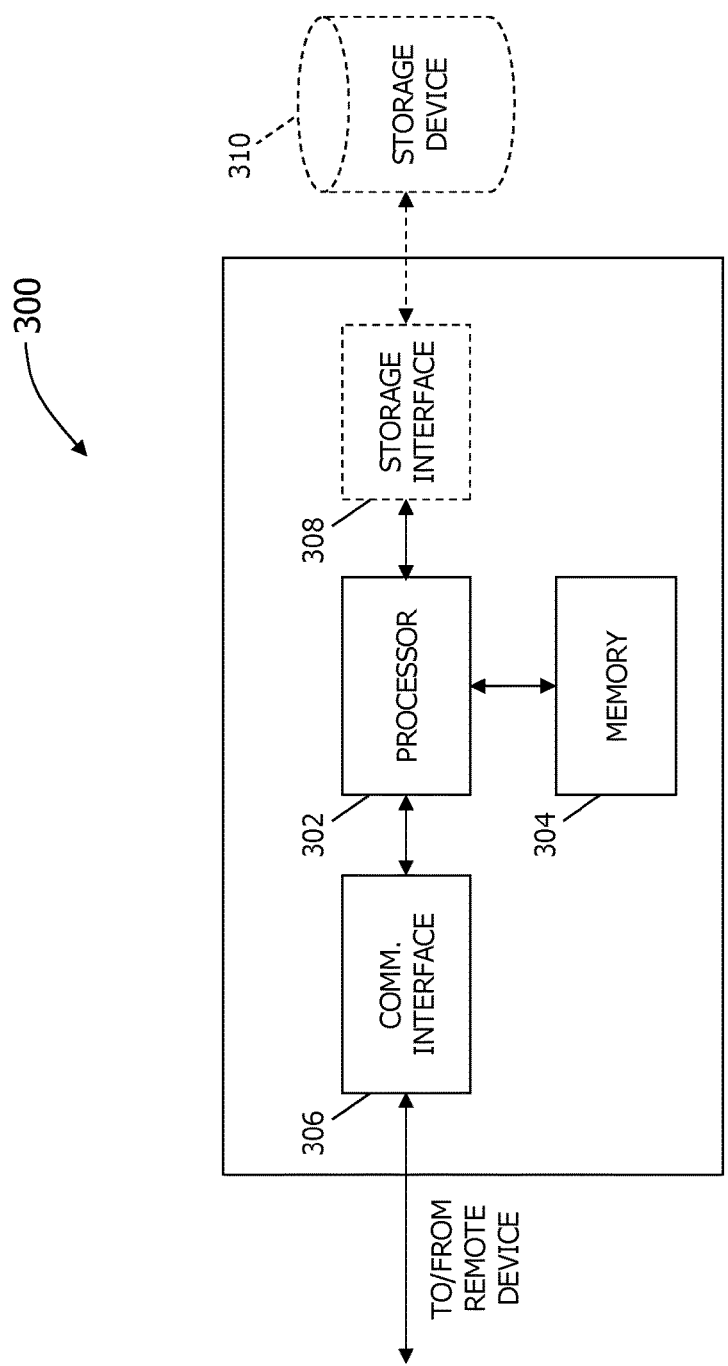
FIG. 3 is an example configuration of a server system of the computing system of FIG. 1.

FIG. 3 is an example configuration of a server system 300. The server system 300 includes, but is not limited to, the application server 102 (shown in FIG. 1) and the database servers 106, 108 (shown in FIG. 1). In the example embodiment, the server system 300 includes a processor 302 for executing instructions. The computer-executable instructions may be stored in a memory device 304, for example. The processor 302 includes one or more processing units (e.g., in a multi-core configuration) for executing the instructions. The instructions may be executed within a variety of different operating systems on the server system 300, such as UNIX, LINUX, Microsoft Windows®, etc. More specifically, the instructions may cause various data manipulations on data stored in a storage device 310 (e.g., create, read, update, and delete procedures). It should also be appreciated that upon initiation of a computer-based method, various instructions may be executed during initialization. Some operations may be required to perform one or more processes described herein, while other operations may be more general and/or specific to a programming language (e.g., C, C#, C++, Java, or other suitable programming languages, etc.). In the example embodiment, the processor 302 may be implemented as one or more cryptographic processors, as described above with respect to the computing system 200.

The processor 302 is operatively coupled to a communication interface 306 such that the server system 300 can communicate with a remote device such as a computing system 200 (shown in FIG. 2) or another server system. For example, the communication interface 306 may receive communications from one or more of the computing devices 116, 118 and/or from one or more of the database servers 106, 108 via the communication network 114, as illustrated in FIG. 1. The communication interface 306 is connectable via wires, such as electrical cables or fiber optic cables, or wirelessly, such as radio frequency (RF) communication. The communication interface 306 may include, for example, a wired or wireless network adapter or a wireless data transceiver for use with Bluetooth communication, RF communication, near field communication (NFC), and/or with a mobile phone network, Global System for Mobile communications (GSM), 3G, or other mobile data network, and/or Worldwide Interoperability for Microwave Access (WiMax) and the like.

The processor 302 is operatively coupled to the storage device 310. The storage device 310 is any computer-operated hardware suitable for storing and/or retrieving data. In some embodiments, the storage device 310 is integrated in the server system 300, while in other embodiments, the storage device 310 is external to the server system 300. In the exemplary embodiment, the storage device 310 includes, but is not limited to, one or more of the databases 110, 112 (shown in FIG. 1). For example, the server system 300 may include one or more hard disk drives as the storage device 310. In other embodiments, the storage device 310 is external to the server system 300 and may be accessed by a plurality of server systems. For example, the storage device 310 may include multiple storage units such as hard disks or solid-state disks in a redundant array of inexpensive disks (RAID) configuration. The storage device 310 may include a storage area network (SAN) and/or a network attached storage (NAS) system.

In some embodiments, the processor 302 is operatively coupled to the storage device 310 via a storage interface 308. The storage interface 308 is any component capable of providing the processor 302 with access to the storage device 310. The storage interface 308 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 302 with access to the storage device 310.

The memory device 304 includes, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only and are thus not limiting as to the types of memory usable for storage of a computer program.

Exemplary Computer-Implemented Methods

Figure 4:
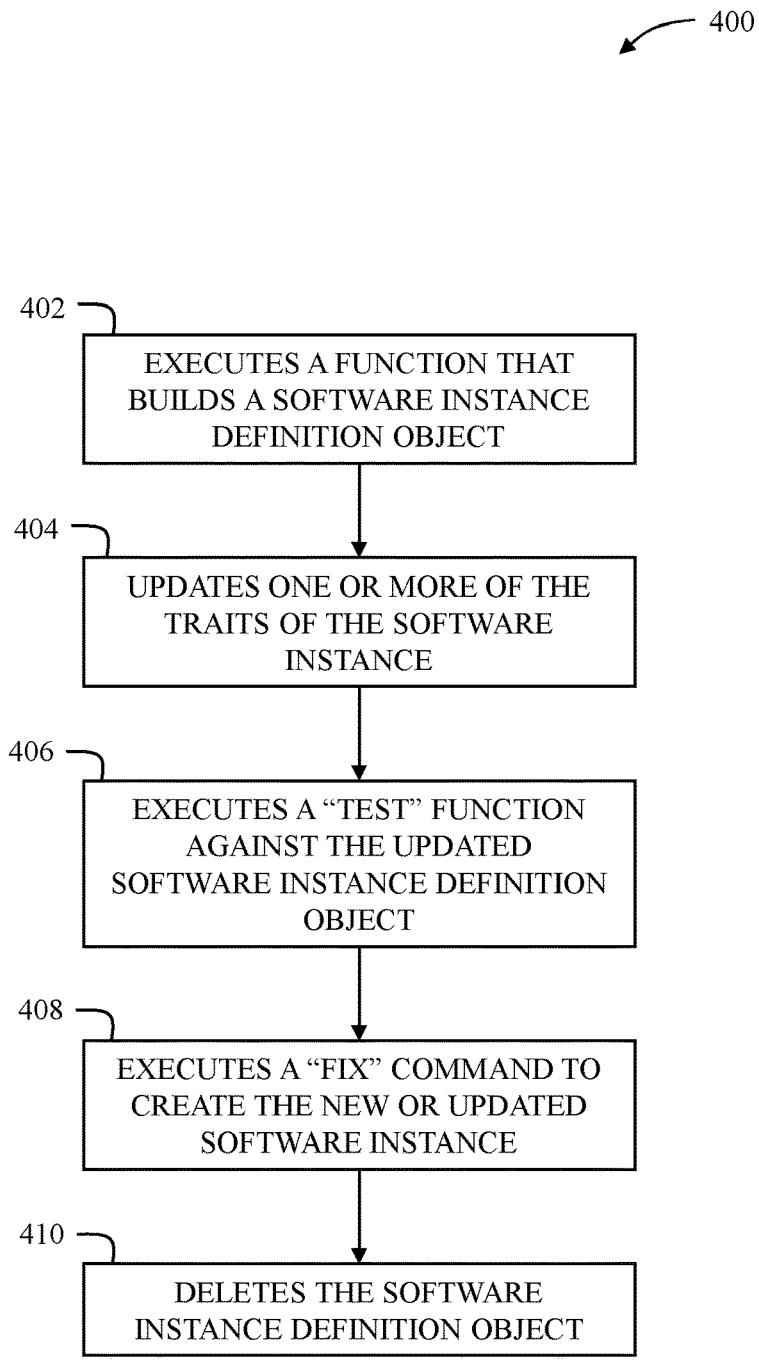
FIG. 4 is a flowchart illustrating an exemplary computer-implemented method for managing instances of a software application, according to one aspect of the present invention.

FIG. 4 is a flowchart illustrating an exemplary computer-implemented method 400 for managing instances of a software application (or product), according to one aspect of the present invention. The operations described herein may be performed in the order shown in FIG. 4 or, according to certain inventive aspects, may be performed in a different order. Furthermore, some operations may be performed concurrently as opposed to sequentially, and/or some operations may be optional, unless expressly stated otherwise or as may be readily understood by one of ordinary skill in the art.

The computer-implemented method 400 is described below, for ease of reference, as being executed by exemplary devices and components introduced with the embodiments illustrated in FIGS. 1-3. In one embodiment, the computer-implemented method 400 is implemented by the application server 102 (shown in FIG. 1). In the exemplary embodiment, the computer-implemented method 400 relates to a semi-declarative technique for generating a dynamic software instance in memory, enabling full testing and validation before the software instance is put into production. While operations within the computer-implemented method 400 are described below regarding the application server 102, according to some aspects of the present invention, the computer-implemented method 400 may be implemented using any other computing devices and/or systems through the utilization of processors, transceivers, hardware, software, firmware, or combinations thereof. A person having ordinary skill will also appreciate that responsibility for all or some of such actions may be distributed differently among such devices or other computing devices without departing from the spirit of the present disclosure.

One or more computer-readable storage medium(s) may also be provided. The computer-readable storage medium(s) may include one or more computer-executable instructions and/or computer-executable programs stored thereon, wherein the instructions(s) or program(s) instruct one or more processors or processing units to perform all or certain of the steps outlined herein. The instruction(s) or program(s) stored on the computer-readable storage medium(s) may instruct the processor or processing units to perform additional, fewer, or alternative actions, including those discussed elsewhere herein.

At operation 402, the application server 102 executes a function that builds a software instance definition object, which is temporarily stored in memory, such as the memory device 304 (shown in FIG. 3). The software instance definition object includes a full definition of a selected software instance, such as a default or template instance or a preexisting customer instance (e.g., the software instances 126, 128 (shown in FIG. 1)). As used herein, the term "template" includes a generic base instance or a default configuration.

In the example embodiment, the tracking databases 110, 112 have stored thereon a plurality of configuration items, attributes, permissions, and/or linkages to other objects (i.e., traits) that are associated with and/or define one or more software instances. The software instance definition object that is built includes selected configuration items, attributes, permissions, and/or linkages to other objects for the selected software instance. For example, the application server 102 may execute a "get" command to build a software instance definition object based on both authoritative sources dependent on the instance to build a reflection of what needs to be in the real world for the instance to be healthy, and also the instance's real-world traits. As such, the software instance definition object includes both the ideal and the real traits of the software instance. In other embodiments, the software instance definition object can be built by instantiating a new software instance definition object by executing a "new" function that returns a template definition object.

In the example embodiment, Microsoft Windows PowerShell is used by the application server 102 to build the software instance definition object. PowerShell includes a Desired State Configuration (DSC) management platform that provides the ability to perform declarative configuration natively within a shell language. This allows declarative programming elements to be incorporated into imperative languages, such as PowerShell or other operating system shells. Script authors may then combine the power of an imperative shell language with the ease of use of a declarative language and may use both imperative and declarative syntax in the same language. In addition, the software instance definition object includes a .NET object, which may be directly manipulated by PowerShell.

At operation 404, the application server 102 updates one or more of the configuration items, attributes, permissions, and/or linkages to other objects contained in the software instance definition object to create an updated software instance definition object (for the same customer). For example, a customer may have requested an update and/or change to their corresponding software instance, such as one of the software instances 126, 128. Alternatively, a new software instance definition object may be created based off of a default or template software instance and/or preexisting software instance via updates to one or more of the configuration items, attributes, permissions, and/or linkages to other objects contained in the software instance definition object.

At operation 406, the application server 102 executes a "test" function against the updated or new software instance definition object. The test function is configured to test the full intended build of the new instance (based on the new software instance definition object) and return a list of changes to real-world configuration items, real-world attributes, real-world permissions, and real-world linkage to other objects, as a result of generating the updated or new instance. In addition, the test function is configured to return a list of all the differences between the real-world configuration items, real-world attributes, real-world permissions, and real-world linkage to other objects and the updated software instance definition object, as well as the updated instance's real-time instance health. The returned information defines an execution plan to update the instance to reflect the updated software instance definition object. As used herein, the term "instance health" includes whether the configuration items for an instance are in such a state that the software application works correctly. Instances can be unhealthy either due to a bad assortment of configuration items or to configuration items not functioning as intended (e.g., servers not responding, databases corrupt, etc.).

At operation 408, the application server 102 executes a "fix" command to update the selected software instance based on the updated software instance definition object, thereby creating a new or updated software instance. For example, if the software instance definition object is for a new software instance, the "fix" command fixes any part of the default or template instance that does not match the definition. That is, the application server 102 creates any new configuration items, attributes, permissions, and/or linkages to other objects necessary to generate the new instance. The new configuration items, attributes, permissions, and/or linkages to other objects are then saved to the tracking databases as the new instance. If the software instance definition object is for an update to an existing software instance, the application server 102 generates and executes the execution plan returned by the "test" command, as described above in operation 406. Any changes to the configuration items, attributes, permissions, and/or linkages to other objects are then saved to the tracking databases under the updated instance. At operation 410, the application server 102 deletes the software instance definition object, which was temporarily stored in memory.

Advantages of the systems and methods describe herein include increasing processing efficiency and reducing memory usage of the application server. Because the techniques use code that is centered on configuration items and inherently supports any assortment of them, the codebase scales linearly with the number of configuration items. That is, the codebase only grows when there are new objects or elements to be customized. Further, because the codebase is focused on the definition of the software instance in the moment, and because the definition object can be passed from one codebase to another via parameters, the semi-declarative model describe herein is extremely useful for the day-to-day operation of the software instance. A status and attributes of the live software instance are easy to get via the "get" command, changes are easy to affect by changing the definition object (which can be passed between codebases as a parameter), and the software instance can be easily updated by invoking the "fix" command to apply the changes.

Additional Considerations

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the current technology can include a variety of combinations and/or integrations of the embodiments described herein.

Although the present application sets forth a detailed description of numerous different embodiments, it should be understood that the legal scope of the description is defined by the words of the claims and equivalent language. The detailed description is to be construed as exemplary only and does not describe every possible embodiment because describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order recited or illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein. The foregoing statements in this paragraph shall apply unless so stated in the description and/or except as will be readily apparent to those skilled in the art from the description.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processor, may be implemented as special purpose or as general purpose. For example, the processor may comprise dedicated circuitry or logic that is permanently configured, such as an application-specific integrated circuit (ASIC), or indefinitely configured, such as a field-programmable gate array (FPGA), to perform certain operations. The processor may also comprise programmable logic or circuitry (e.g., as encompassed within a general-purpose processor or other programmable processor) that is temporarily configured by software to perform certain operations. It will be appreciated that the decision to implement the processor as special purpose, in dedicated and permanently configured circuitry, or as general purpose (e.g., configured by software) may be driven by cost and time considerations.

Accordingly, the term "processor" or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processor is temporarily configured (e.g., programmed), each of the processors need not be configured or instantiated at any one instance in time. For example, where the processor comprises a general-purpose processor configured using software, the general-purpose processor may be configured as respective different processors at different times. Software may accordingly configure the processor to constitute a particular hardware configuration at one instance of time and to constitute a different hardware configuration at a different instance of time.

Computer hardware components, such as transceiver elements, memory elements, processors, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, at a later time, access the memory device to retrieve and process the stored output. Computer hardware components may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processors may be located in a single location (e.g., within a home environment, an office environment or as a server farm), while in other embodiments the processors may be distributed across a number of locations.

Unless specifically stated otherwise, discussions herein using words such as "processing," "computing," "calculating," "determining," "presenting," "displaying," or the like may refer to actions or processes of a machine (e.g., a computer with a processor and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

Although the disclosure has been described with reference to the embodiments illustrated in the attached figures, it is noted that equivalents may be employed, and substitutions made herein, without departing from the scope of the disclosure as recited in the claims.

What is claimed is:

1. A computer system comprising:
   a processor; and
   a memory device comprising computer-executable instructions stored thereon, the computer-executable instructions, when executed by the processor, causing the processor to:
   execute a function that builds a software instance definition object, the software instance definition object including one or more of the following: a configuration item, attribute, permission, and linkage to other objects, the software instance definition object defining a software instance;
   temporarily store the software instance definition object in the memory device;
   update one or more of the configuration item, attribute, permission, and linkage to other objects of the stored software instance definition object, thereby creating an updated software instance definition object;
   execute a second function against the updated software instance definition object, the second function configured to return a list of differences between real-world configuration items, real-world attributes, real-world permissions, and real-world linkages to other objects that define the software instance and the updated software instance definition object;
   execute a first command to update the software instance based on the updated software instance definition object, thereby creating an updated software instance; and
   after creating the updated software instance, delete the software instance definition object.

2. The computer system in accordance with claim 1, said operation of executing the function that builds the software instance definition object comprising executing a second command to build the software instance definition object based on authoritative sources dependent on the software instance and real-world traits of the software instance.

3. The computer system in accordance with claim 1, said operation of executing the function that builds the software instance definition object comprising instantiating a new software instance definition object by executing a second function that returns a template definition object.

4. The computer system in accordance with claim 1, wherein the returned list defines an execution plan to update the software instance to reflect the updated software instance definition object.

5. The computer system in accordance with claim 4, said operation of executing the first command comprising executing the execution plan.

6. The computer system in accordance with claim 1, further comprising a tracking database,
   said operation of executing the first command comprising:
   creating one or more of the following: a new configuration item, a new attribute, a new permission, and a new linkage to other objects, necessary to generate the updated software instance; and
   saving the one or more new configuration item, a new attribute, a new permission, and a new linkage to other objects to the tracking database as the updated software instance.

7. A method executed by an application server, the method comprising:
   executing a function that builds a software instance definition object, the software instance definition object including one or more of the following: a configuration item, attribute, permission, and linkage to other objects, the software instance definition object defining a software instance;
   temporarily storing the software instance definition object in a memory device;
   updating one or more of the configuration item, attribute, permission, and linkage to other objects of the stored software instance definition object, thereby creating an updated software instance definition object;
   executing a second function against the updated software instance definition object, the second function configured to return a list of differences between real-world configuration items, real-world attributes, real-world permissions, and real-world linkages to other objects that define the software instance and the updated software instance definition object
   executing a first command to update the software instance based on the updated software instance definition object, thereby creating an updated software instance; and
   after creating the updated software instance, deleting the software instance definition object.

8. The method in accordance with claim 7,
   said operation of executing the function that builds the software instance definition object comprising executing a second command to build the software instance definition object based on authoritative sources dependent on the software instance and real-world traits of the software instance.

9. The method in accordance with claim 7,
said operation of executing the function that builds the software instance definition object comprising instantiating a new software instance definition object by executing a second function that returns a template definition object.

10. The method in accordance with claim 7, wherein the returned list defines an execution plan to update the software instance to reflect the updated software instance definition object.

11. The method in accordance with claim 10, said operation of executing the first command comprising executing the execution plan.

12. The method in accordance with claim 7,
said operation of executing the first command comprising:
creating one or more of the following: a new configuration item, a new attribute, a new permission, and a new linkage to other objects, necessary to generate the update software instance; and
saving the one or more new configuration item, a new attribute, a new permission, and a new linkage to other objects to a tracking database as the updated software instance.

13. A non-transitory computer-readable storage medium having computer-executable instructions stored thereon, the computer-executable instructions, when executed by a processor, causing the processor to:
execute a function that builds a software instance definition object, the software instance definition object including one or more of the following: a configuration item, attribute, permission, and linkage to other objects, the software instance definition object defining a software instance;
temporarily store the software instance definition object in a memory device;
update one or more of the configuration item, attribute, permission, and linkage to other objects of the stored software instance definition object, thereby creating an updated software instance definition object;
execute a second function against the updated software instance definition object, the second function configured to return a list of differences between real-world configuration items, real-world attributes, real-world permissions, and real-world linkages to other objects that define the software instance and the updated software instance definition object
execute a first command to update the software instance based on the updated software instance definition object, thereby creating an updated software instance; and
after creating the updated software instance, delete the software instance definition object.

14. The computer-readable storage medium in accordance with claim 13,
said operation of executing the function that builds the software instance definition object comprising executing a second command to build the software instance definition object based on authoritative sources dependent on the software instance and real-world traits of the software instance.

15. The computer-readable storage medium in accordance with claim 13,
said operation of executing the function that builds the software instance definition object comprising instantiating a new software instance definition object by executing a second function that returns a template definition object.

16. The computer-readable storage medium in accordance with claim 13,
wherein the returned list defines an execution plan to update the software instance to reflect the updated software instance definition object,
said operation of executing the first command comprising executing the execution plan.

17. The computer-readable storage medium in accordance with claim 13, said operation of executing the first command comprising:
creating one or more of the following: a new configuration item, a new attribute, a new permission, and a new linkage to other objects, necessary to generate the updated software instance; and
saving the one or more new configuration item, a new attribute, a new permission, and a new linkage to other objects to a tracking database as the updated software instance.

\* \* \* \* \*